(12) United States Patent
Bode et al.

(10) Patent No.: US 10,900,785 B2
(45) Date of Patent: Jan. 26, 2021

(54) MICROMECHANICAL ROTATIONAL RATE SENSOR SYSTEM AND CORRESPONDING PRODUCTION METHOD

(71) Applicant: Robert Bosch GmbH, Stuttgart (DE)

(72) Inventors: Niels Bode, Stuttgart (DE); Andreas Lassi, Korntal-Muenchingen (DE); Burkhard Kuhlmann, Reutlingen (DE); Jan-Timo Liewald, Kusterdingen (DE); Matthias Kuehnel, Boeblingen (DE); Nils Felix Kuhlmann, Ehningen (DE); Odd-Axel Pruetz, Nuertingen (DE); Peter Degenfeld-Schonburg, Renningen (DE); Reinhard Neul, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 163 days.

(21) Appl. No.: 16/127,791

(22) Filed: Sep. 11, 2018

(65) Prior Publication Data

US 2019/0078887 A1    Mar. 14, 2019

(30) Foreign Application Priority Data

Sep. 12, 2017 (DE) .......................... 10 2017 216 010

(51) Int. Cl.
*G01C 19/5762* (2012.01)
*G01C 19/5747* (2012.01)
*G01C 19/5712* (2012.01)

(52) U.S. Cl.
CPC ..... *G01C 19/5762* (2013.01); *G01C 19/5712* (2013.01); *G01C 19/5747* (2013.01)

(58) Field of Classification Search
CPC ............ G01C 19/5747; G01C 19/5762; G01C 19/5712; G01C 19/574; G01C 19/5755
See application file for complete search history.

(56) References Cited

U.S. PATENT DOCUMENTS

| | | | | |
|---|---|---|---|---|
| 2010/0122576 A1* | 5/2010 | Classen | ................ | G01C 19/574 73/504.12 |
| 2010/0199762 A1* | 8/2010 | Meisel | ............... | G01C 19/5747 73/504.12 |

(Continued)

FOREIGN PATENT DOCUMENTS

| DE | 102010061755 A1 | 5/2012 |
|---|---|---|
| DE | 102010062095 A1 | 5/2012 |

(Continued)

*Primary Examiner* — Helen C Kwok
(74) *Attorney, Agent, or Firm* — Norton Rose Fulbright Us LLP; Gerard Messina

(57) ABSTRACT

A micromechanical rotational rate sensor system includes a first rotational rate sensor device that can be driven rotationally about a first axis in oscillating fashion for acquiring a first external rate of rotation about a second axis and a second external rate of rotation about a third axis, the first, second, and third axes being perpendicular to one another; and a second rotational rate sensor device, capable of being driven in linearly oscillating fashion along the second axis, for acquiring a third external rate of rotation about the first axis. The first rotational rate sensor device is connected to the second rotational rate sensor device via a drive frame device. The drive frame device has a first drive frame and a second drive frame that are capable of being driven in oscillating fashion by the drive device with opposite phase along the third axis.

14 Claims, 7 Drawing Sheets

(56) References Cited

U.S. PATENT DOCUMENTS

| | | | | |
|---|---|---|---|---|
| 2011/0023600 A1* | 2/2011 | Wrede | ............... | G01C 19/5747 |
| | | | | 73/504.13 |
| 2012/0055248 A1* | 3/2012 | Hammer | ........... | G01C 19/5712 |
| | | | | 73/504.12 |
| 2012/0279301 A1* | 11/2012 | Gunthner | ............ | G01C 19/574 |
| | | | | 73/504.12 |
| 2013/0269469 A1* | 10/2013 | Rocchi | ................... | G01C 19/04 |
| | | | | 74/5 F |
| 2013/0298672 A1* | 11/2013 | Kuhlmann | ........ | G01C 19/5747 |
| | | | | 73/504.12 |
| 2014/0060184 A1* | 3/2014 | Walther | ............ | G01C 19/5712 |
| | | | | 73/504.03 |
| 2014/0116134 A1* | 5/2014 | Classen | .............. | G01C 19/5712 |
| | | | | 73/504.12 |
| 2014/0260610 A1* | 9/2014 | McNeil | ............. | G01C 19/5712 |
| | | | | 73/504.12 |
| 2014/0373628 A1* | 12/2014 | Balslink | ............ | G01C 19/5769 |
| | | | | 73/504.12 |
| 2016/0084653 A1* | 3/2016 | Balslink | ............ | G01C 19/5712 |
| | | | | 73/504.12 |

FOREIGN PATENT DOCUMENTS

| | | | |
|---|---|---|---|
| DE | 102011006394 | A1 | 10/2012 |
| WO | 9639615 | A1 | 12/1996 |

\* cited by examiner

MICROMECHANICAL ROTATIONAL RATE SENSOR SYSTEM AND CORRESPONDING PRODUCTION METHOD

CROSS REFERENCE

The present application claims the benefit under 35 U.S.C. § 119 of German Patent Application No. DE 102017216010.1 filed on Sep. 12, 2017, which is expressly incorporated herein by reference in its entirety.

FIELD

The present invention relates to a micromechanical rotational rate sensor system and to a corresponding production method.

BACKGROUND INFORMATION

Although any micromechanical components are also applicable, the present invention and its underlying problems are explained on the basis of micromechanical rotational rate sensor systems for motor vehicles.

While the use of three-axis rotational rate sensors is standard in the area of consumer electronics, for automotive applications one-axis rotational rate sensors are typically used.

For more complex automotive applications, such as inertial navigation for automated driving or for satellite-supported navigation, positional determination of camera-based or lidar-based environmental sensor systems, or for two-wheeled vehicle applications, robust three-axis rotational rate sensors are required.

German Patent Application No. DE 10 2010 062 095 A1 and PCT application WO 96/39615 describe two-axis rotational rate sensor devices having two rotor devices that can be driven in oscillating fashion with opposite phase about a first axis and can be tilted anti-symmetrically about a second and third axis.

German Patent Application No. 10 2010 061 755 A1 describes a rotational rate center having a first Coriolis element, a second Coriolis element, a third Coriolis element, and a fourth Coriolis element, the first Coriolis element and the fourth Coriolis element being capable of being driven in the same direction parallel to a second axis that extends parallel to the main plane of extension and perpendicular to the first axis, and the first and the second Coriolis element being capable of being driven in opposite directions parallel to the second axis, and the first Coriolis element and the third Coriolis element being capable of being driven in opposite directions parallel to the second axis.

German Patent Application No. DE 10 2011 006 394 A1 describes a one-axis rotational rate sensor that oscillates in a plane.

SUMMARY

The present invention provides a micromechanical rotational rate sensor system, and a corresponding production method.

Preferred developments of the present invention are described herein.

In accordance with the present invention, a one-axis and a two-axis rotational rate sensor are connected via a common drive mechanism. The resulting three-axis rotational rate sensor is robust against external linear and rotational acceleration, so that in particular the requirements for safety-relevant applications in the automotive field are satisfied.

The micromechanical rotational rate sensor system according to the present invention, having the common drive mechanism for all three measurement axes, offers a plurality of advantages in comparison with three individual rotational rate sensors. Because there is only one drive mechanism, drive structures, as well as connecting pads and the associated wiring, can be saved in the sensor core. In this way, the ASIC can also be made compact, because only one drive control circuit has to be provided. Particularly advantageous is the avoidance of different drive frequencies for the various rotational rate sensors, so that a mutual influencing, e.g., through parasitic crosstalk of the drive forces, can be avoided. In addition, the packaging is simpler, and possible misalignments of the individual rotational rate sensors relative to one another are excluded by the design of the rotational rate sensor system according to the present invention.

Interference modes, which can cause a faulty signal of a three-axis rotational rate sensor in various ways, e.g., due to (resonant) excitation due to external forces (vibration), or which could occur due to non-linear crosstalk in the mechanics or electrostatics of the system, can be avoided. If, in contrast, three identical one-axis rotational rate sensors are used, then all rotational rate sensors have the same interference modes, which are at different frequencies depending on the process, so that overall the number of interference modes in a particular frequency range is tripled. In a multi-axis rotational rate sensor, it is thus possible to further achieve a reduction of the interference modes in that the same detection structures are each designed to be sensitive to more than only one measurement axis.

According to a preferred development of the present invention, the first rotational rate sensor device, which can be driven rotationally, has a first rotor device that can be driven in oscillating fashion about the first axis and a second rotor device that can be driven in oscillating fashion about the first axis with an opposite phase to the first rotor device. The first rotor device can be tilted by the first external rate of rotation about the second axis and by the second external rate of rotation about the third axis (x), and the second rotor device can be tilted by the first external rotational rate about the second axis and the second external rotational rate about the third axis (x) anti-parallel to the first rotor device. A first coupling device is provided that has a first spring device via which the first rotor device and the second rotor device are coupled in such a way that a parallel tilting about the second axis is suppressed and an anti-parallel tilting about the second axis is enabled, and a second coupling device is provided via which the first rotor device and the second rotor device are coupled in such a way that a parallel tilting about the third axis is suppressed and an antiparallel tilting about the third axis is enabled. A first acquisition device is used to acquire an antiparallel tilting of the first and second rotor device about the second axis, and a second acquisition device is used to acquire an antiparallel tilting of the first and second rotor device about the third axis. Such a rotational rate sensor device can be manufactured so as to be robust.

According to a further preferred development of the present invention, the second rotational rate sensor device, which can be driven in linear fashion, has a frame device having a first frame and a second frame, the second frame being at least partly surrounded by the first frame, the first frame being capable of being driven in oscillating fashion along the third axis, and the second frame being capable of being driven in oscillating fashion along the third axis in opposite phase to the first frame, the first and the second frame being capable of being deflected by the third external rotational rate about the first axis with opposite phase along the second axis in oscillating fashion, and the first frame having a first partial frame and a second partial frame, and the second frame having a third partial frame and a fourth partial frame. A third coupling device is provided via which the first partial frame and the third partial frame are coupled in such a way that a deflection with the same phase of the first and third partial frame along the third axis is suppressed and a deflection with opposite phase of the first and third partial frame along the third axis is enabled, and a fourth coupling device is provided via which the second partial frame and the fourth partial frame are coupled in such a way that a deflection with the same phase of the second and fourth partial frame along the third axis is suppressed and a deflection with opposite phase of the second and fourth partial frame along the third axis is enabled. A third acquisition device is used to acquire a deflection with opposite phase of the first and second frame along the second axis. Such a rotational rate sensor device can be coupled well with the rotationally drivable first rotational rate sensor device.

According to a further preferred development of the present invention, the first drive frame has a first partial drive frame and a second partial drive frame, and the second drive frame has a third partial drive frame and a fourth partial drive frame, the first partial drive frame and second partial drive frame being connected, via a fifth coupling device, to opposite sides of the first rotor device, and the third partial drive frame and fourth partial drive frame being connected, via a sixth coupling device, to opposite sides of the second rotor device. This enables a symmetrical drive.

According to a further preferred development of the present invention, the third partial drive frame is connected, via a seventh coupling device, to the first partial frame, the fourth partial drive frame being connected, via an eighth coupling device, to the second partial frame. In this way, an effective linear coupling of the first and second partial frame can be achieved.

According to a further preferred development of the present invention, a ninth coupling device is provided for connecting the first partial drive frame and the second partial drive frame, and a tenth coupling device is provided for connecting the third partial drive frame and the fourth partial drive frame. In this way, an effective linear coupling of the partial drive frames can be achieved.

According to a further preferred development of the present invention, an eleventh coupling device is provided for connecting the first partial drive frame and the third partial drive frame, and a twelfth coupling device is provided for connecting the second partial drive frame and the fourth partial drive frame. In this way, an effective linear coupling of the further partial drive frames can be achieved.

According to a further preferred development of the present invention, the drive device has a first drive for driving the first drive frame and a second drive for driving the second drive frame. This enables a symmetrical drive.

According to a further preferred development of the present invention, the drive device has a single common drive for driving the first drive frame and for driving the second drive frame. This saves space in the design.

According to a further preferred development of the present invention, the drive frame device has a first beam-shaped drive frame and a second beam-shaped drive frame, the first beam-shaped drive frame being connected, via a thirteenth coupling device, to a side of the first and second rotational rate sensor device, and the second beam-shaped drive frame being connected, via a fourteenth coupling device, to an opposite side of the first and second rotational rate sensor device. This enables the formation of a simple drive frame device.

According to a further preferred development of the present invention, the second coupling device has a first rocker that is connected to the first and second rotor device via a first spring device, and a second rocker that is connected to the first and second rotor device via a second spring device. This is an effective anti-symmetrical coupling.

According to a further preferred development of the present invention, the first and/or second rotor device has one or more quadrature electrodes that are designed to interact with quadrature electrodes situated below them. This increases the drive precision.

According to a further preferred development of the present invention, the first acquisition device and the second acquisition device each have a plurality of capacitive plate electrodes that are situated underneath the first and second rotor device. In this way, the tilting can be reliably detected.

According to a further preferred development of the present invention, the third acquisition device has a plurality of capacitive comb electrodes situated inside the first and second frame. In this way, the anti-symmetrical deflection can be reliably detected.

BRIEF DESCRIPTION OF THE DRAWINGS

Further features and advantages of the present invention are explained in the following on the basis of specific embodiments with reference to the Figures.

DETAILED DESCRIPTION OF EXAMPLE EMBODIMENTS

Figure 1:
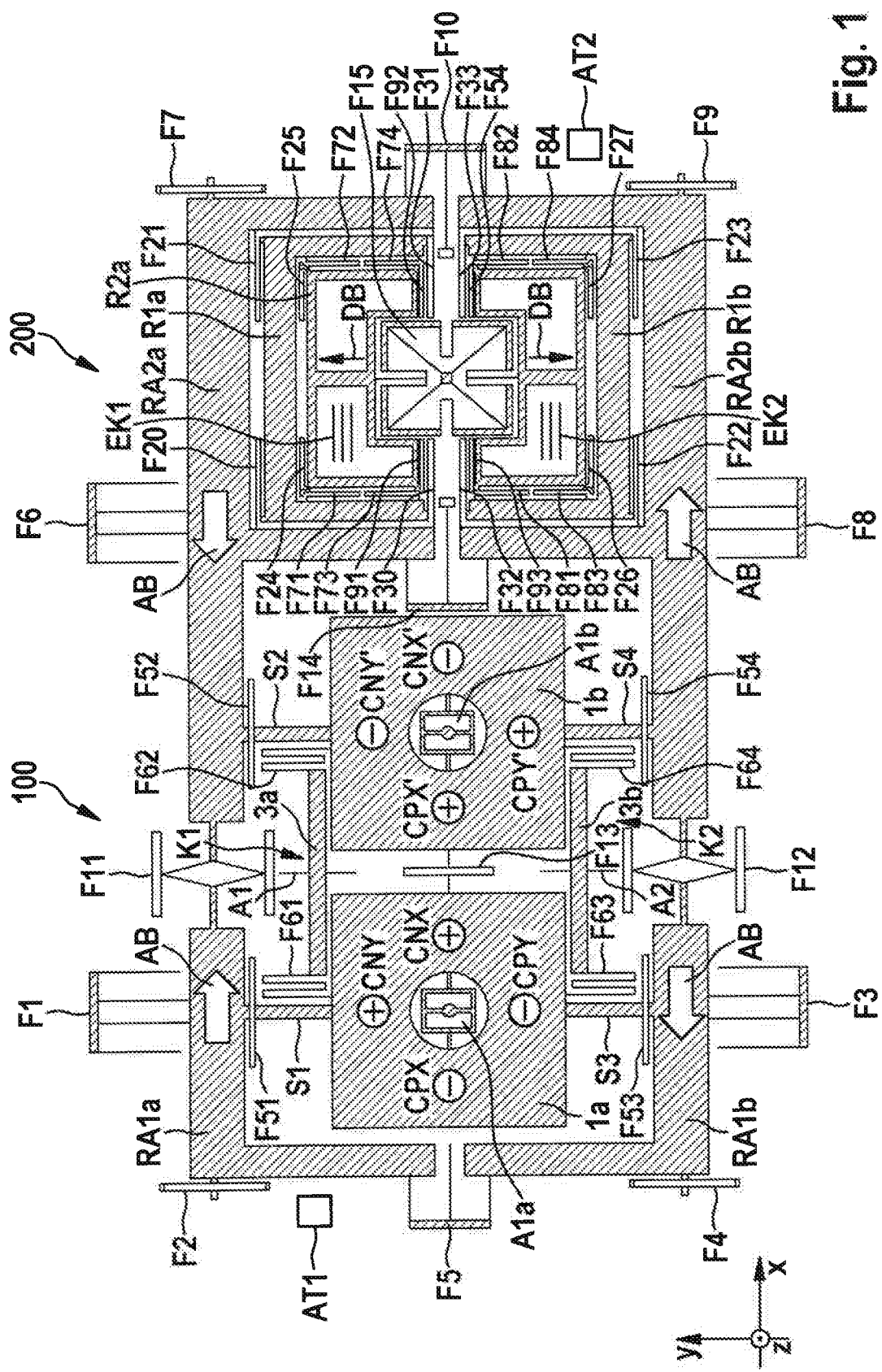
FIG. 1 shows a schematic plane representation for the explanation of a micromechanical rotational rate sensor system according to a first specific embodiment of the present invention.

In the Figures, identical reference characters designate identical or functionally identical elements.

FIG. 1 shows a schematic plane representation for the explanation of a micromechanical rotational rate sensor system according to a first specific embodiment of the present invention.

In FIG. 1, reference character 100 designates a first rotational rate sensor device, which can be driven rotationally about a first axis (z axis) in oscillating fashion, in order to acquire a first external rate of rotation about a second axis (y axis) and a second external rate of rotation about a third axis (x axis). The first, second, and third axes (z, y, x) are configured perpendicular to one another.

The rotationally drivable first rotational rate sensor device 100 has a first rotor device 1a that can be driven in oscillating fashion about the first axis (z axis) and a second rotor device 1b that can be driven in oscillating fashion about the first axis (z axis) with opposite phase to first rotor device 1a.

In the present first specific embodiment, first rotor device 1a and second rotor device 1b are realized as square plates, an associated first or second suspension device A1a, A1b being situated and anchored in a respective central opening.

First rotor device 1a can be tilted by the first external rate of rotation about the second axis (y axis) and by the second external rate of rotation about the third axis (x axis). Second rotor device 1b can be tilted by the first external rate of rotation about the second axis (y axis) and by the second external rate of rotation about the third axis (x axis) antiparallel to first rotor device 1a.

First and second rotor device 1a, 1b are coupled, via a first spring device F13 as first coupling device, in such a way that a parallel tilting about the second axis (y axis) is suppressed, and an anti-parallel tilting about the second axis (y axis) is enabled, on the basis of an anisotropic spring constant.

Additionally provided is a second coupling device K1, K2 via which the first rotor device 1a and the second rotor device 1b are coupled in such a way that a parallel tilting about the third axis (x axis) is suppressed and an antiparallel tilting about the third axis (x axis) is enabled, also on the basis of an anisotropic spring constant of second coupling device K1, K2.

Second coupling device K1, K2 has a first part K1 having a first rocker 3a connected at both sides to first and second rotor device 1a, 1b via a respective spring device F61, F62. First rocker 3a has a first elastic suspension A1 that is anchored on a substrate (not shown).

In addition, second coupling device K1, K2 has a second part K2 that has a second rocker 3b that is connected to the first and second rotor device 1a, 1b via a respective spring device F63, F64. Second rocker 3b has a second elastic suspension A2 that is anchored on the substrate (not shown).

A first acquisition device CPY, CNY, CPY', CNY' is used to acquire an antiparallel tilting of first and second rotor device 1a, 1b about the second axis (y axis). A second acquisition device CPX, CNX, CPX', CNX' is used to acquire an anti-parallel tilting of first and second rotor device 1a, 1b about the third axis (x axis).

First acquisition device CPY, CNY, CPY', CNY' and second acquisition device CPX, CNX, CPX', CNX' each have for example a respective plurality of capacitive plate electrodes that are situated underneath first and second rotor device 1a, 1b, as is shown schematically in FIG. 1 by respective circles.

A drive device AT1, AT2, for example a comb drive device (shown only schematically), which has a first drive AT1 and a second drive AT2, is provided for a linearly oscillating drive along the third axis (x axis).

First drive AT1 is connected to a first drive frame RA1a, RA1B, which has a first partial drive frame RA1a and a second partial drive frame RA1B.

Second drive AT2 is connected to a second drive frame RA2a, RA2B, which has a third partial drive frame RA2a and a third partial drive frame RA2B.

First drive frame RA1a, RA1b and second drive frame RA2a, RA2b are made with an angular shape, and run laterally from first rotor device 1a, in the plane thereof.

First partial drive frame RA1a is connected to a substrate (not shown) via springs F1, F2. Second partial drive frame RA1b is connected to the substrate via springs F3, F4. In addition, first partial drive frame RA1a and second partial drive frame RA1b are connected to one another via a spring F5. Springs F1 through F5 are made such that an oscillating movement along the third axis (x axis) is preferred.

Third partial drive frame RA2a is connected to the substrate (not shown) via springs F6, F7. Fourth partial drive frame RA2b is connected to the substrate via springs F8, F9. In addition, third partial drive frame RA2a and fourth partial drive frame RA2b are connected to one another via a spring F10. Springs F6 through F10 are also realized such that an oscillating movement along the third axis (x axis) is preferred.

First partial drive frame RA1a is connected to a side of first rotor device 1a via a web S1 and a spring F51. Second partial drive frame RA1b is connected to an opposite side of first rotor device 1a via a web S3 and a spring F53.

Springs F10, F14 connect third partial drive frame RA2a and fourth partial drive frame RA2b.

Third partial drive frame RA2a and fourth partial drive frame RA2b surround second rotor device 1b and a second rotational rate sensor device 200, which can be driven in linearly oscillating fashion along the third axis (x axis), in order to acquire a third external rotational rate about the first axis (z axis), which is explained further below.

In addition, third partial drive frame RA2a and fourth partial drive frame RA2b extend in an intermediate space between first rotational rate sensor device 100 and second rotational rate sensor device 200, where they are connected to one another via spring F14.

Third partial drive frame RA2a is connected to the same side of second rotor device 1b via a web S2 and a spring F52, and fourth partial drive frame RA2b is connected to the same opposite side of second rotor device 1b via a web S4 and a spring F54.

In addition, first partial drive frame RA1a and third partial drive frame RA2a are connected via spring F11, and second partial drive frame RA1b and fourth partial drive frame RA2b are connected to one another via a spring F12. Springs F11, F12 are realized such that an opposite-phase oscillating movement along the third axis (x axis) is preferred, and a same-phase movement is suppressed. The respective direction of drive movement AB of first and second drive frame RA1a, RA1b, RA2a, RA2b is shown by corresponding arrows.

Second rotational rate sensor device 200 has a frame device having a first frame R1a, R1b and a second frame R2a, R2b, first frame R1a, R1b having a first partial frame R1a and a second partial frame R1b, and second frame R2a, R2b having a third partial frame R2a and a fourth partial frame R2b. Second frame R2a, R2b is surrounded on three adjacent sides by first frame R1a, R1b.

First frame R1a, R1b is capable of being driven in oscillating fashion along third axis x by second drive AT2, via third and fourth partial drive frames RA2a, RA2b and a spring device F20-F23, F30-F33.

Second frame R2a, R2b is capable of being driven in oscillating fashion indirectly by first frame R1a, R1b along third axis x, with opposite phase to first frame R1a, R1b, because a spring device F71-F74 is provided via which first partial frame R1a and third partial frame R2a are coupled in such a way that a same-phase deflection of first and third partial frame R1a, R2a along third axis x is suppressed, and an opposite-phase deflection of first and third partial frame R1a, R2a along third axis x is enabled. Via an analogous spring device F81-F84, second partial frame R1b and fourth partial frame R2b are coupled in such a way that a same-phase deflection of second and fourth partial frame R1b, R2b along third axis x is suppressed, and an opposite-phase deflection of second and fourth partial frame R1b, R2b along third axis x is enabled.

An anisotropic spring device F24, F24, F91, F92 connects third partial frame R2a to the substrate, an anisotropic spring device F26, F27, F93, F94 connects fourth partial frame R2b to the substrate, and an anisotropic spring device F15 connects the substrate to third partial frame R2a and to fourth partial frame R2b, and connects third partial frame R2a and fourth partial frame R2b to each other.

First and second frame R1a, R1b, R2a, R2b are capable of being deflected in oscillating fashion by the third external rate of rotation about first axis z, with opposite phase along second axis y. The direction of drive movement AB and the direction of detection movement DB are shown by corresponding arrows.

A third acquisition device EK1, EK2, such as a capacitive comb structure, is used to acquire an opposite-phase deflection of first and second frame R1a, R1b, R2a, R2b along second axis y; in the present example, only the mutual deflection of third partial frame R2a and fourth partial frame R2b are acquired by third acquisition device EK1, EK2.

Figure 2:
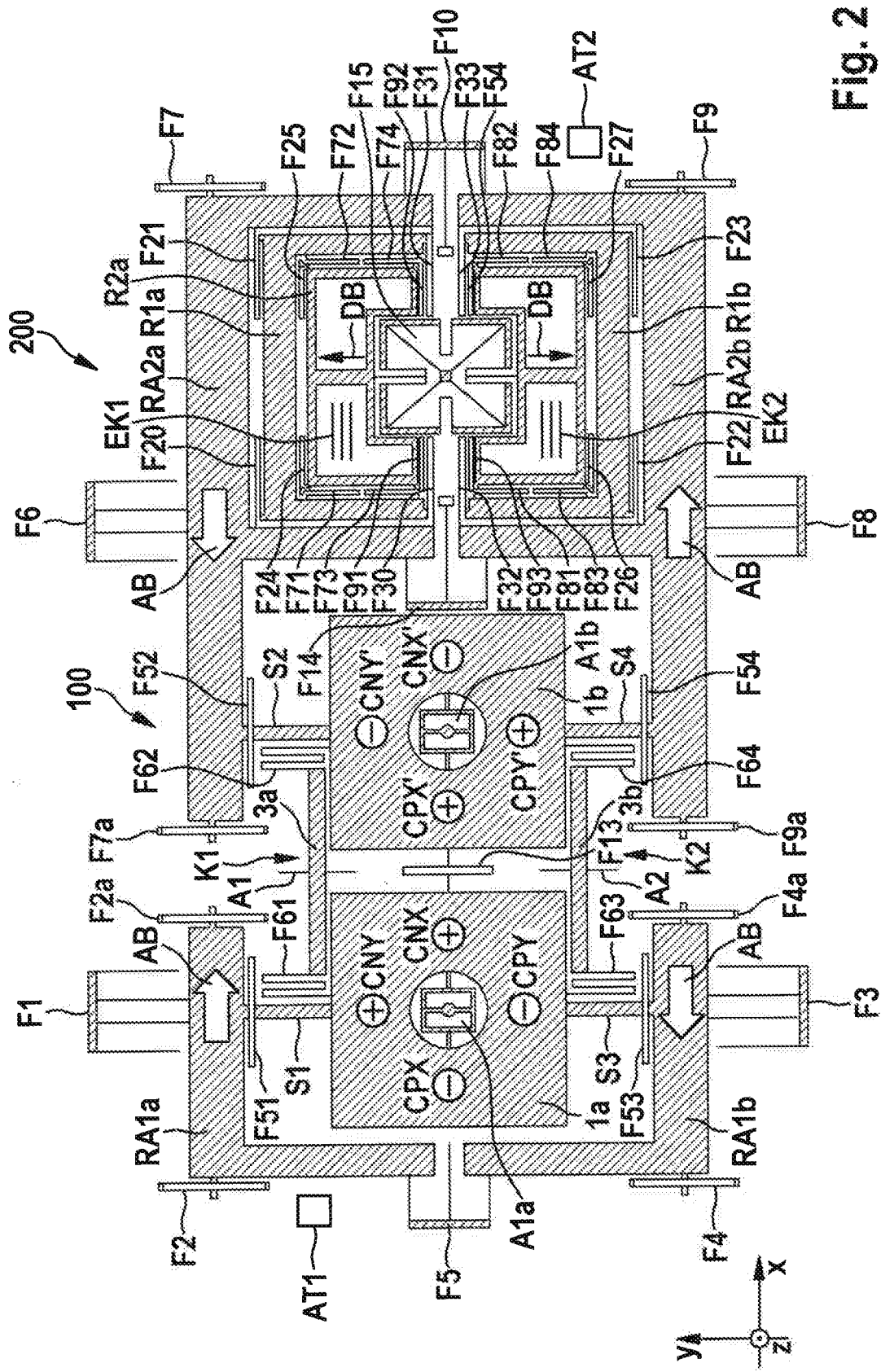
FIG. 2 shows a schematic plane representation for the explanation of a micromechanical rotational rate sensor system according to a second specific embodiment of the present invention.

FIG. 2 shows a schematic plane representation for the explanation of a micromechanical rotational rate sensor system according to a second specific embodiment of the present invention.

The second specific embodiment is realized analogously to the above-described first specific embodiment according to FIG. 1, and differs therefrom only in that first partial drive frame RA1a and third partial drive frame RA2a are not connected directly to one another, and second partial drive frame RA1b and fourth partial drive frame RA2b are also not directly connected to one another. First partial drive frame RA1a is connected to the substrate by a spring F2a, second partial drive frame RA1b is connected to the substrate via a spring F4a, third partial drive frame RA2a is connected to the substrate via a spring F1a, and fourth partial drive frame is connected to the substrate via a spring F9A.

An indirect connection of first drive frame RA1a, RA1b, and of second drive frame RA2a, RA2b is provided in the second specific embodiment via the above-described components F51 S1, F61 3a, F62 S2, F52 on the one side of first rotational rate acquisition device 100, and by the above-described components F53 S3, F63 3b, F64 S4, F54 on the opposite side.

Figure 3:
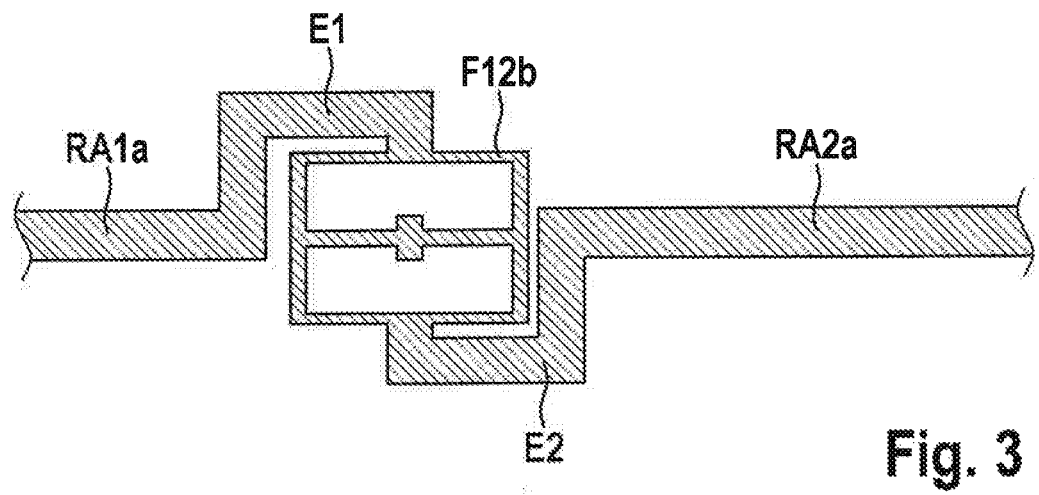
FIG. 3 shows an enlarged detail representation of a first alternative type of coupling of the first and second drive frame of the rotational rate sensor system according to the first specific embodiment of the present invention.

FIG. 3 shows an enlarged detail view of a first alternative type of coupling of the first and second drive frame of the rotational rate sensor system according to the first specific embodiment of the present invention.

In the first alternative type of coupling, first partial drive frame RA1a and third partial drive frame RA2a each have an angled-off end E1 or E2, a quadratic spring F12b being placed between the ends E1, E2 and anchored in the substrate.

Figure 4:
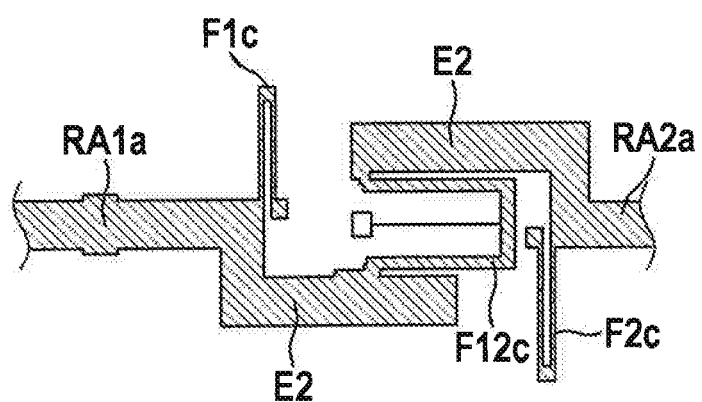
FIG. 4 shows an enlarged detail representation of a second alternative type of coupling of the first and second drive frame of the rotational rate sensor system according to the first specific embodiment of the present invention.

FIG. 4 shows an enlarged detail representation of a second alternative type of coupling of the first and second drive frame of the rotational rate sensor system according to the first specific embodiment of the present invention.

In the second alternative type of coupling, first partial drive frame RA1a and second partial drive frame RA2a each respectively have an angled-off end E1 or E2, a U-shaped spring F12c being placed between the ends E1, E2 and anchored in the substrate. A spring F1c at the first end, anchored in the substrate, and a spring F2c of the second end, anchored in the substrate, are also provided in the substrate.

Figure 5:
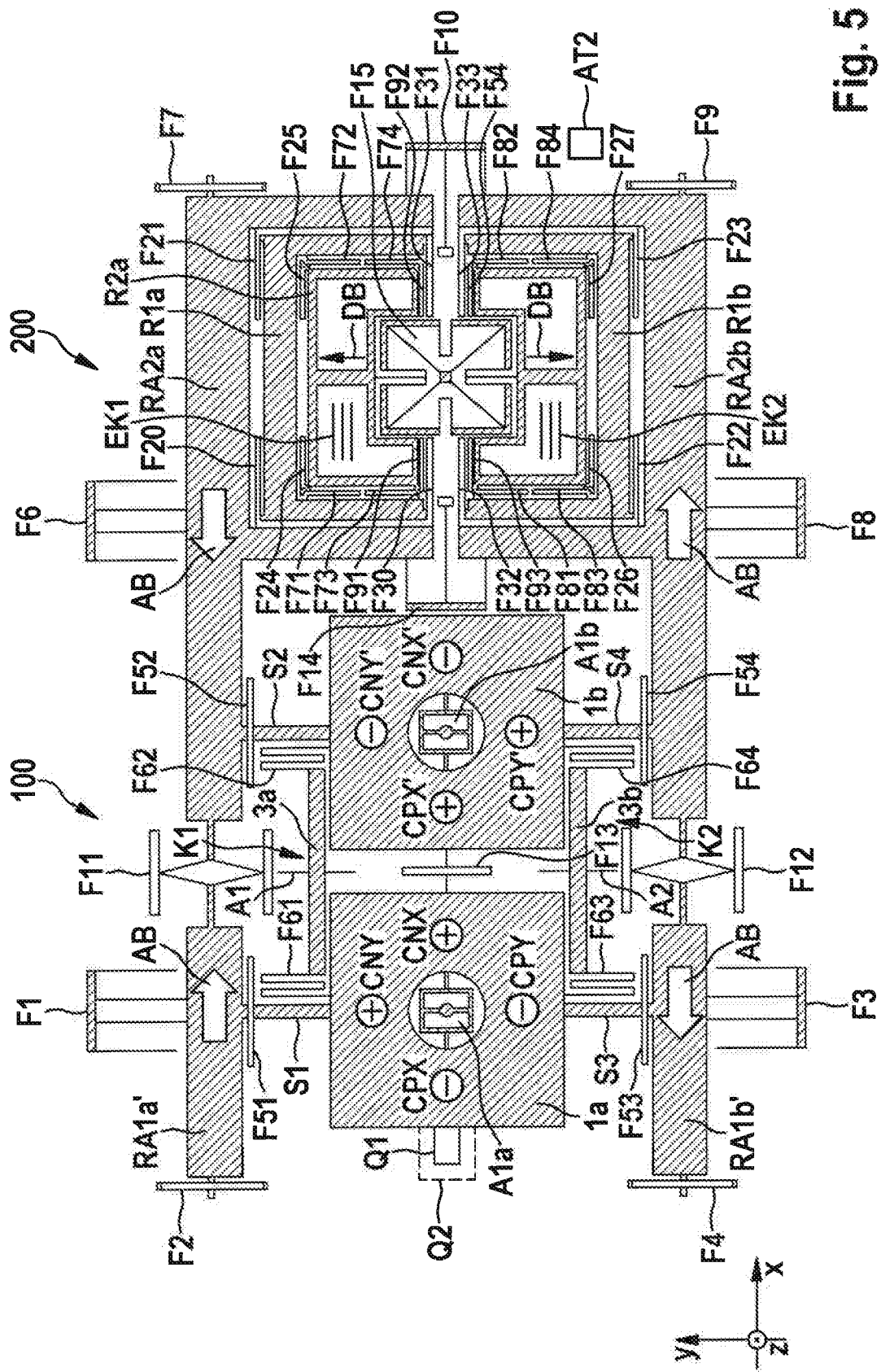
FIG. 5 shows a schematic plane representation for the explanation of a micromechanical rotational rate sensor system according to a third specific embodiment of the present invention.

FIG. 5 shows a schematic plane representation for the explanation of a micromechanical rotational rate sensor system according to a third specific embodiment of the present invention.

In the third specific embodiment, first partial drive frame RA1a' and second partial drive frame RA1b' are not realized with an angular shape, but rather are straight, and are not connected to one another, because spring F5 is omitted.

In particular, in this third specific embodiment only one drive is provided, here second drive AT2, already described above.

In addition, in all the specific embodiments first drive AT1 can be omitted where first drive frame RA1a, RA1b and second drive frame RA2a, RA2b are coupled to one another in linear fashion.

Further schematically shown is a quadrature electrode Q1 placed on first rotor device 1a, and which works together capacitively with a quadrature electrode Q2 situated under it in order to prevent movements outside the x-y plane by applying a corresponding voltage. Of course, such quadrature electrodes can be provided at other locations of the two rotor devices 1a, 1b in order to stabilize the operation of the first rotational rate acquisition device.

Figure 6:
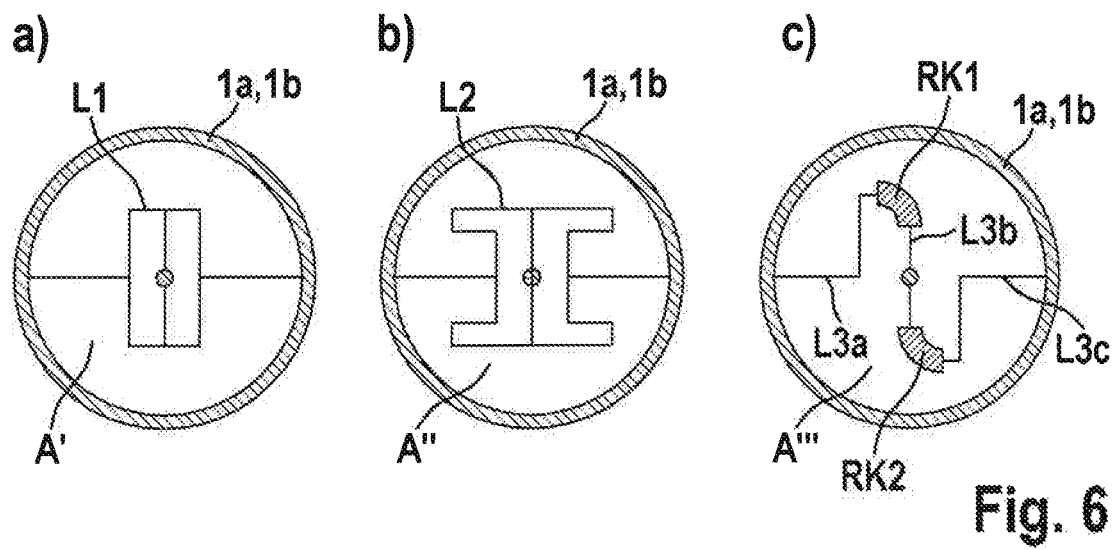
FIG. 6a)-c) show schematic plane representations for the explanation of various spring suspension devices for the micromechanical rotational rate sensor system according to the present invention.

FIG. 6a)-c) show schematic plane representations for the explanation of various spring suspension devices for the micromechanical rotational rate sensor system according to the present invention.

In FIG. 6a)-c), in particular three different embodiments A', A'', and A''' are shown of first and second suspension device A1a, A1b of first and second rotor device 1a, 1b.

The first embodiment has a first folded spring L1 that is capable of rotation about the first axis (z axis) and is capable of tilting about the second axis (y axis) and third axis (x axis).

The second embodiment has a differently folded spring L2 that has the same mechanical properties.

The third embodiment A1''' has a combination of elastic springs L3a, L3b, L3c that are connected to one another via rigid curved bow elements RK1, RK2. The third embodiment A1''' is also capable of rotating about the first axis (z axis) and of tilting about the second axis (y axis) and the third axis (x axis).

Suspension devices A', A", A'" are each centrally anchored on the substrate (not shown).

Figure 7:
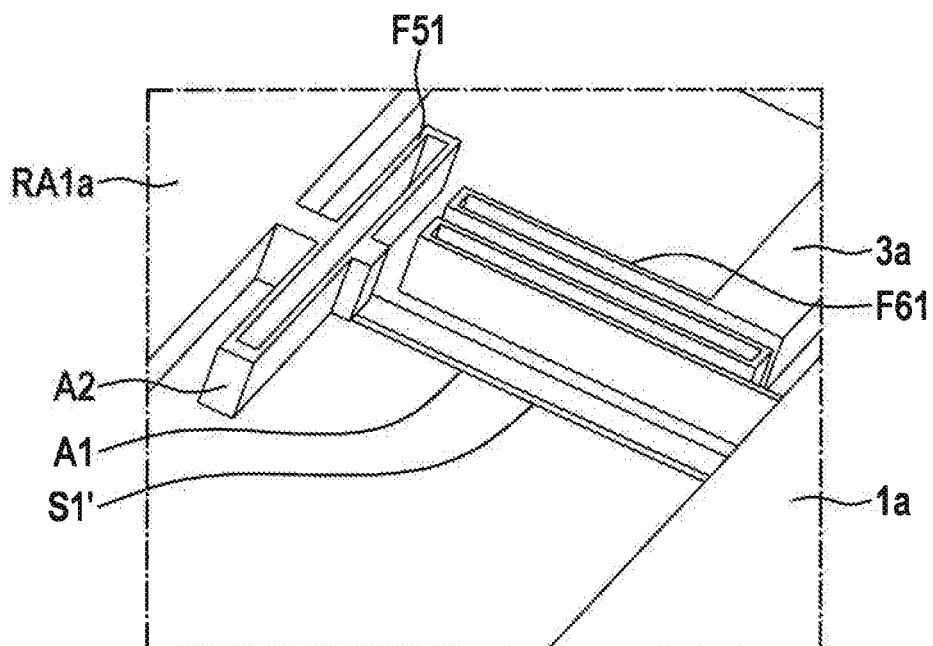
FIG. 7 shows an enlarged detail representation of a first alternative type of coupling of the rotor devices to the drive frame.

FIG. 7 shows an enlarged detail representation of a first alternative type of coupling of the rotor devices with the drive frame.

In the alternative type of coupling according to FIG. 7, webs S1 through S4, with which first rotor device 1a and second rotor device 1b are connected to first drive frame RA1a, RA1b and to second drive frame RA2a, RA2b, are realized with a smaller thickness D1 than are the adjacently situated springs F51, F52, F53, F54 and rotor devices 1a, 1b. In FIG. 7, this is shown only for thin web S1', for simplicity.

Such a thin realization of web S1', and of the other webs, facilitates tilting about the third axis z.

In other respects, the design corresponds to the above-described first or second specific embodiment.

Figure 8:
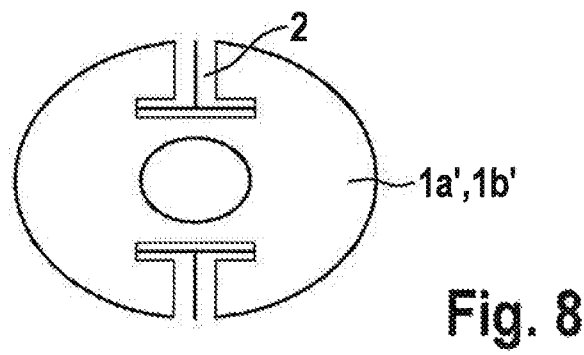
FIG. 8 shows an enlarged detail representation of a second alternative type of coupling of the rotor devices to the drive frame.

FIG. 8 shows an enlarged detail representation of a second alternative type of coupling of the rotor devices to the drive frame.

In the second alternative type of coupling of the rotor devices, here having reference characters 1a', 1b', and which are realized as circular discs in the present example, a respective spring is introduced into oppositely situated segments of rotor devices 1a', 1b' and is anchored there, which devices are connected at the other side to the corresponding drive frames (not shown).

Such a realization enables a modified translation of the linear movement into the rotational movement, which means that the drive length of the linear movement can be shorter in order to achieve the same angle of rotation.

This second alternative type of coupling is also usable in all the specific embodiments described here.

Figure 9:
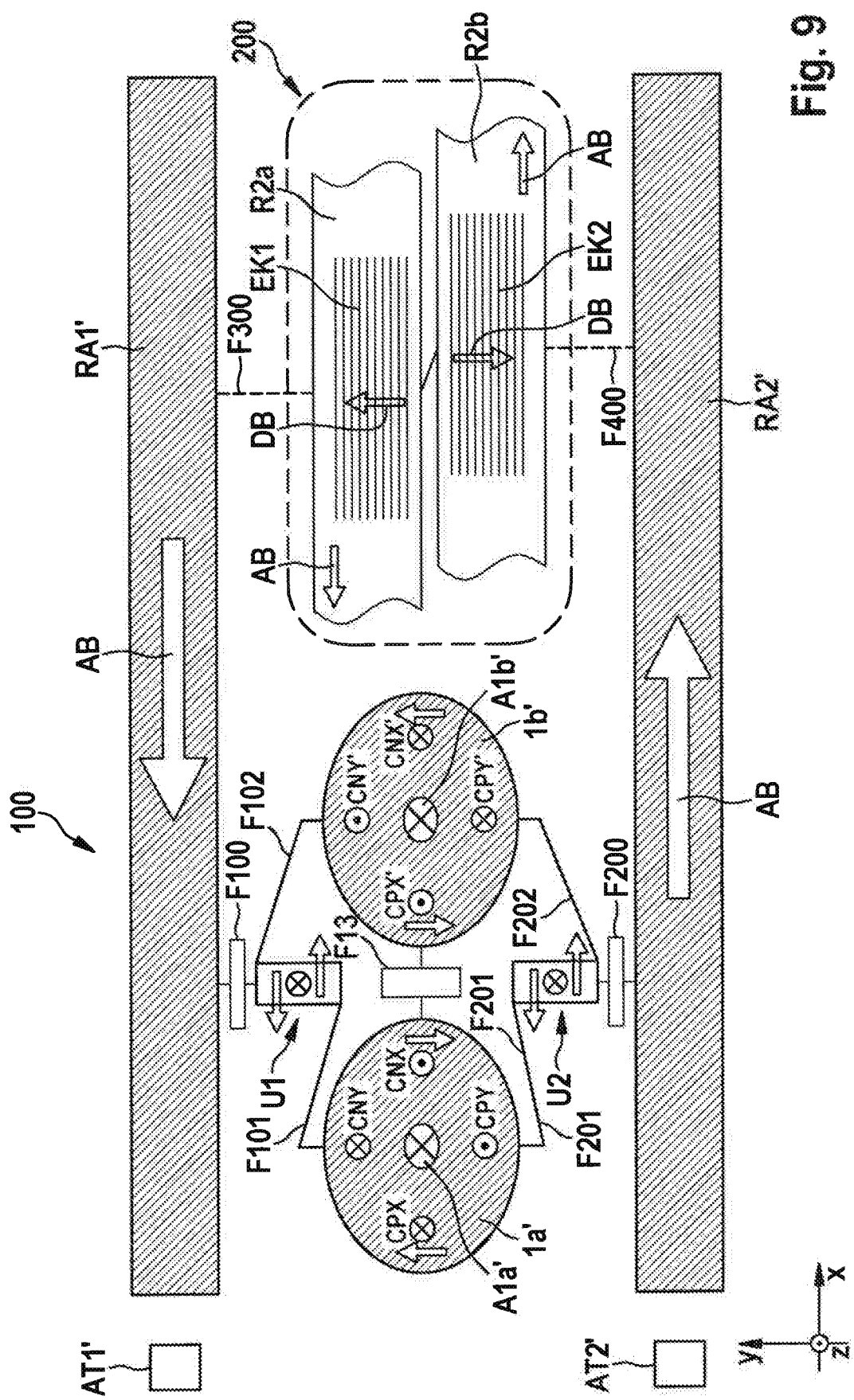
FIG. 9 shows a schematic plane representation for the explanation of a micromechanical rotational rate sensor system according to a fourth specific embodiment of the present invention.

FIG. 9 shows a schematic plane representation for the explanation of a micromechanical rotational rate sensor system according to a fourth specific embodiment of the present invention.

In the fourth specific embodiment, second rotational rate acquisition device 200 is shown only schematically, in order to provide a simplified representation. However, the design corresponds to the design of second rotational rate sensor device 200 already described above with reference to the first through fourth specific embodiments.

In the fourth specific embodiment, drive device AT1', AT2' has a first drive AT1' and a second drive AT2', first drive AT1' acting on a first beam-shaped drive frame RA1', and second drive AT2' acting on a second beam-shaped drive frame RA2'. First and second drive frames RA1', RA2' are configured in parallel on opposite sides of the first and second rotational rate sensor device 100, 200, and are also capable of being driven with opposite phase in linearly oscillating fashion along the third axis by drive device AT1', AT2'.

Via a spring F100, a deflection device U1, and springs F101, F102, first drive frame RA1' is connected to first rotor device 1a' or to second rotor device 1b', whose respective suspension device is here designated with reference character A1a' or A1b'.

Analogously, second drive frame RA2' is connected to first rotor device 1a' or to second rotor device 1b' via a spring F100, a second deflecting device U2, and springs F201, F202.

In this way, the rotational drive of first and second rotor device 1a', 1b' is brought about.

First and second deflecting device U1, U2 are anchored in the substrate so as to be capable of rotational motion via corresponding suspensions.

Second rotational rate sensor device 200 is connected to first drive frame RA1' via a schematically shown spring device F300, and is connected to second drive frame RA2' via a schematically shown spring device F400, whereby the linear opposite-phase drive movement of third partial frame R2a and fourth partial frame R2b, and their opposite-phase detection movement DB along second axis y, can be achieved.

Figure 10:
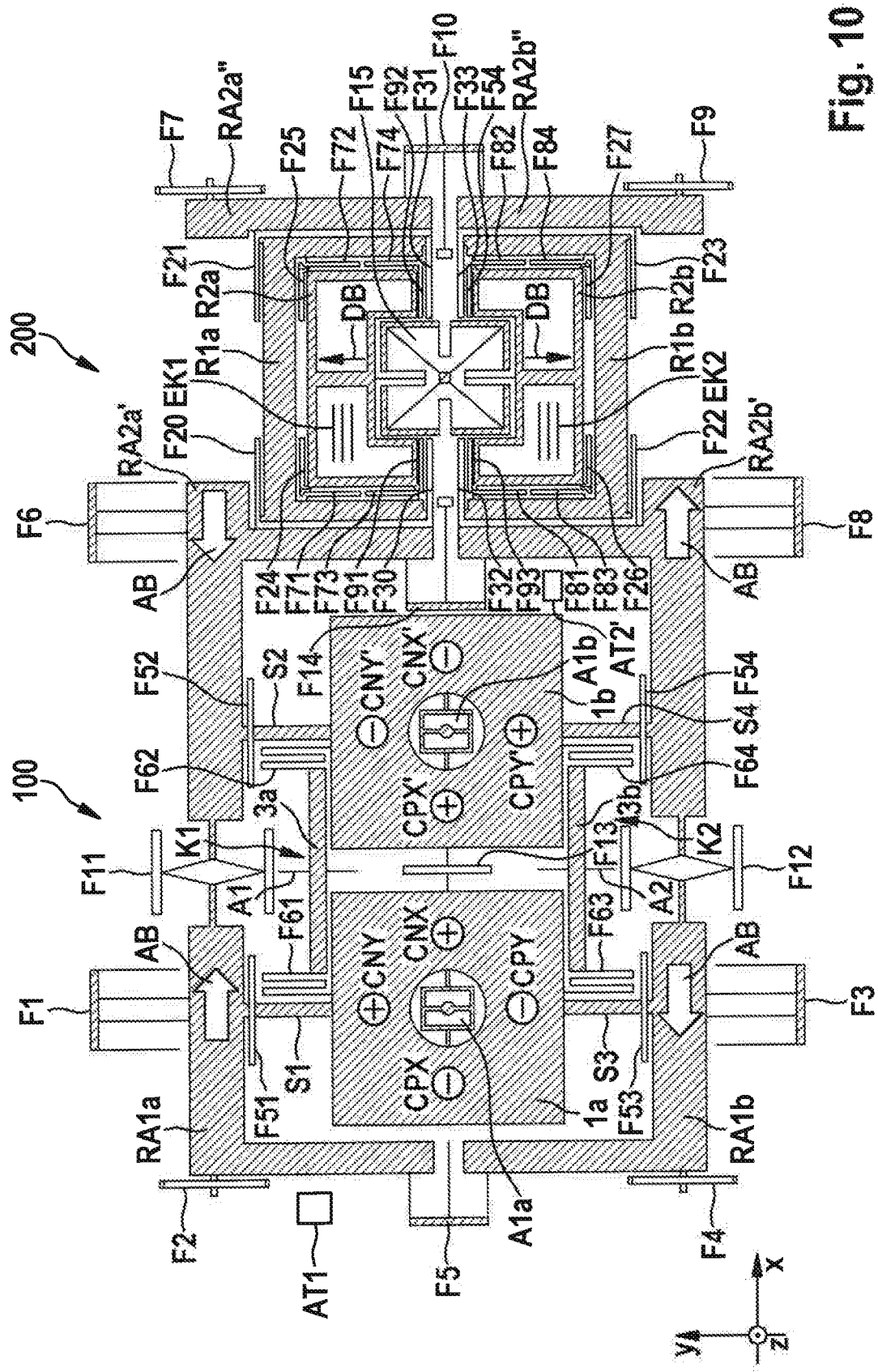
FIG. 10 shows a schematic plane representation for the explanation of a micromechanical rotational rate sensor system according to a fifth specific embodiment of the present invention.

FIG. 10 shows a schematic plane representation for the explanation of a micromechanical rotational rate sensor system according to a fifth specific embodiment of the present invention.

The fifth specific embodiment corresponds to the first specific embodiment, second drive AT2' being situated not outside second drive frame RA2a', RA2b', but rather inside second drive frame RA2a', RA2b'.

In addition, the second drive frame is interrupted, edge regions RA2a", RA2b" being connected to the substrate only via springs F7, F9, but not being directly connected to second drive AT2'.

Although the present invention has been described on the basis of preferred exemplary embodiments, it is not limited thereto. In particular, the named materials and topologies are given only as examples and are not limited to the explained examples.

The geometry and symmetry of the depicted first and second rotational rate sensor device in the above specific embodiments is given only as an example, and can be varied as needed.

What is claimed is:

1. A micromechanical rotational rate sensor system, comprising:
    a first rotational rate sensor device capable of being driven rotationally about a first axis in oscillating fashion by a drive device via a drive frame device, for acquiring a first external rate of rotation about a second axis and a second external rate of rotation about a third axis, the first axis, the second axis, and the third axis being perpendicular to one another; and
    a second rotational rate sensor device capable of being driven in linearly oscillating fashion along the third axis by the drive device via the drive frame device, for acquiring a third external rate of rotation about the first axis, wherein the second rotational rate sensor device includes a frame device having a first frame and a second frame, the second frame being surrounded at least partly by the first frame, the first frame being capable of being driven in oscillating fashion along the third axis, and the second frame being capable of being driven in oscillating fashion along the third axis with opposite phase to the first frame, the first frame and second frame being capable of being deflected in oscillating fashion by the third external rate of rotation about the first axis with opposite phase along the second axis, the first frame having a first partial frame and a second partial frame, and the second frame having a third partial frame and a fourth partial frame;
    wherein the first rotational rate sensor device is connected to the second rotational rate sensor device via the drive frame device; and
    wherein the drive frame device has a first drive frame and a second drive frame that are capable of being driven in oscillating fashion by the drive device with opposite phase along the third axis.

2. The micromechanical rotational rate sensor system as recited in claim 1, wherein the rotationally driven first rotational rate sensor device includes:

a first rotor device that is capable of being driven in oscillating fashion about the first axis; and a second rotor device that is capable of being driven in oscillating fashion about the first axis with opposite phase to the first rotor device, wherein the first rotor device is capable of being tilted by the first external rate of rotation about the second axis and by the second external rate of rotation about the third axis, and the second rotor device being capable of being tilted by the first external rate of rotation about the second axis and by the second external rate of rotation about the third axis anti-parallel to the first rotor device;

a first coupling device that has a first spring device via which the first rotor device and the second rotor device are coupled in such a way that a parallel tilting about the second axis is suppressed, and an anti-parallel tilting about the second axis is enabled;

a second coupling device via which the first rotor device and the second rotor device are coupled in such a way that a parallel tilting about the third axis is suppressed, and an antiparallel tilting about the third axis is enabled;

a first acquisition device for acquiring an anti-parallel tilting of the first rotor device and second rotor device about the second axis; and a second acquisition device for acquiring an antiparallel tilting of the first and second rotor device about the third axis.

3. A micromechanical rotational rate sensor system, comprising:

a first rotational rate sensor device capable of being driven rotationally about a first axis in oscillating fashion by a drive device via a drive frame device, for acquiring a first external rate of rotation about a second axis and a second external rate of rotation about a third axis, the first axis, the second axis, and the third axis being perpendicular to one another; and a second rotational rate sensor device capable of being driven in linearly oscillating fashion along the third axis by the drive device via the drive frame device, for acquiring a third external rate of rotation about the first axis wherein the first rotational rate sensor device is connected to the second rotational rate sensor device via the drive frame device; and wherein the drive frame device has a first drive frame and a second drive frame that are capable of being driven in oscillating fashion by the drive device with opposite phase along the third axis, wherein the rotationally driven first rotational rate sensor device includes:

a first rotor device that is capable of being driven in oscillating fashion about the first axis; and a second rotor device that is capable of being driven in oscillating fashion about the first axis with opposite phase to the first rotor device, wherein the first rotor device is capable of being tilted by the first external rate of rotation about the second axis and by the second external rate of rotation about the third axis, and the second rotor device being capable of being tilted by the first external rate of rotation about the second axis and by the second external rate of rotation about the third axis anti-parallel to the first rotor device;

a first coupling device that has a first spring device via which the first rotor device and the second rotor device are coupled in such a way that a parallel tilting about the second axis is suppressed, and an anti-parallel tilting about the second axis is enabled;

a second coupling device via which the first rotor device and the second rotor device are coupled in such a way that a parallel tilting about the third axis is suppressed, and an antiparallel tilting about the third axis is enabled;

a first acquisition device for acquiring an anti-parallel tilting of the first rotor device and second rotor device about the second axis; and a second acquisition device for acquiring an antiparallel tilting of the first and second rotor device about the third axis, wherein the linearly driven second rotational rate sensor device includes:

a frame device having a first frame and a second frame, the second frame being surrounded at least partly by the first frame, the first frame being capable of being driven in oscillating fashion along the third axis, and the second frame being capable of being driven in oscillating fashion along the third axis with opposite phase to the first frame, the first frame and second frame being capable of being deflected in oscillating fashion by the third rate of rotation about the first axis with opposite phase along the second axis, the first frame having a first partial frame and a second partial frame, and the second frame having a third partial frame and a fourth partial frame;

a third coupling device via which the first partial frame and the third partial frame are coupled in such a way that a same-phase deflection of the first and third partial frame along the third axis is suppressed, and an opposite-phase deflection of the first and third partial frame along the third axis is enabled;

a fourth coupling device via which the second partial frame and the fourth partial frame are coupled in such a way that a same-phase deflection of the second and fourth partial frame along the third axis is suppressed, and an opposite-phase deflection of the second and fourth partial frame along the third axis is enabled; and a third acquisition device for acquiring an opposite-phase deflection of the first and second frame along the second axis.

4. The micromechanical rotational rate sensor system as recited in claim 3, wherein the first drive frame has a first partial drive frame and a second partial drive frame, and the second drive frame having a third partial drive frame and a fourth partial drive frame, the first partial drive frame and the second partial drive frame being connected, via a fifth coupling device, to opposite sides of the first rotor device, and the third partial drive frame and the fourth partial drive frame being connected, via a sixth coupling device, to opposite sides of the second rotor device.

5. The micromechanical rotational rate sensor system as recited in claim 4, wherein the third partial drive frame is connected, via a seventh coupling device, to the first partial frame, and the fourth partial drive frame is connected, via an eighth coupling device, to the second partial frame.

6. The micromechanical rotational rate sensor system as recited in claim 5, further comprising:

a ninth coupling device connecting the first partial drive frame and the second partial drive frame; and a tenth coupling device connecting the third partial drive frame and the fourth partial drive frame.

7. The micromechanical rotational rate sensor system as recited in claim 6, further comprising:

an eleventh coupling device connecting the first partial drive frame and the third partial drive frame; and a twelfth coupling device connecting the second partial drive frame and the fourth partial drive frame.

8. The micromechanical rotational rate sensor system as recited in claim 1, wherein the drive device has a first drive for driving the first drive frame and a second drive for driving the second drive frame.

9. The micromechanical rotational rate sensor system as recited in claim 1, wherein the drive device has a single common drive for driving the first drive frame and for driving the second drive frame.

10. The micromechanical rotational rate sensor system as recited in claim 2, wherein the second coupling device has a first rocker that is connected, via a first spring device, to the first and second rotor device, and has a second rocker that is connected, via a second spring device, to the first and second rotor device.

11. The micromechanical rotational rate sensor system as recited in claim 3, wherein at least one of the first and/or second rotor device has one or more quadrature electrodes that are designed to interact with quadrature electrodes situated under the at least one of the first and/or second rotor device.

12. The micromechanical rotational rate sensor system as recited in claim 2, wherein the first acquisition device and the second acquisition device each having a plurality of capacitive plate electrodes that are situated underneath the first and second rotor device.

13. The micromechanical rotational rate sensor system as recited in claim 3, wherein the third acquisition device has a plurality of capacitive comb electrodes that are situated inside the first and second frame.

14. A production method for a micromechanical rotational rate sensor system, comprising:

forming a drive frame device that has a first drive frame and a second drive frame that are capable of being driven in oscillating fashion by a drive device with opposite phase along a third axis;

forming a first rotational rate sensor device, which is capable of being driven rotationally about a first axis in oscillating fashion by the drive device via the drive frame device, for acquiring a first external rate of rotation about a second axis and a second external rate of rotation about the third axis, the first axis, the second axis, and the third axis being perpendicular to one another;

forming a second rotational rate sensor device, capable of being driven in linearly oscillating fashion along the third axis by the drive device via the drive frame device, for acquiring a third external rate of rotation about the first axis, wherein the second rotational rate sensor device includes a frame device having a first frame and a second frame, the second frame being surrounded at least partly by the first frame, the first frame being capable of being driven in oscillating fashion along the third axis, and the second frame being capable of being driven in oscillating fashion along the third axis with opposite phase to the first frame, the first frame and second frame being capable of being deflected in oscillating fashion by the third external rate of rotation about the first axis with opposite phase along the second axis, the first frame having a first partial frame and a second partial frame, and the second frame having a third partial frame and a fourth partial frame; and connecting the first rotational rate sensor device to the second rotational rate sensor device via the drive frame device.

\* \* \* \* \*